(12) United States Patent
Reddy et al.

(10) Patent No.: US 10,019,699 B2
(45) Date of Patent: Jul. 10, 2018

(54) METHODS FOR ADJUSTING NEAR FIELD COMMUNICATIONS CIRCUITRY DURING MOBILE PAYMENT TRANSACTIONS

(71) Applicant: Apple Inc., Cupertino, CA (US)

(72) Inventors: Vusthla Sunil Reddy, Sunnyvale, CA (US); Mohit Narang, Cupertino, CA (US); Peter Agboh, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 734 days.

(21) Appl. No.: 14/287,151

(22) Filed: May 26, 2014

(65) Prior Publication Data
US 2014/0304094 A1  Oct. 9, 2014

(51) Int. Cl.
*G06Q 20/00* (2012.01)
*G06Q 20/20* (2012.01)
*F21V 8/00* (2006.01)
*H05K 1/18* (2006.01)
*G06Q 20/32* (2012.01)
*G06Q 40/00* (2012.01)
*H04B 5/00* (2006.01)

(52) U.S. Cl.
CPC ......... *G06Q 20/204* (2013.01); *G02B 6/0073* (2013.01); *G02B 6/0088* (2013.01); *G02B 6/0091* (2013.01); *G06Q 20/3223* (2013.01); *H05K 1/189* (2013.01); *G02B 6/0068* (2013.01)

(58) Field of Classification Search
USPC .......................................................... 705/17
See application file for complete search history.

(56) References Cited

U.S. PATENT DOCUMENTS

| | | | | |
|---|---|---|---|---|
| 7,499,455 B2 * | 3/2009 | Lee | ................... | H04W 72/1289 370/312 |
| 2004/0152470 A1 * | 8/2004 | Spain | .................... | H04W 64/00 455/456.1 |
| 2004/0209610 A1 * | 10/2004 | Adwankar | ........ | H04M 3/42144 455/419 |
| 2005/0225436 A1 * | 10/2005 | Diorio | ................ | G06K 19/0723 340/10.51 |
| 2005/0234778 A1 * | 10/2005 | Sperduti | ................ | G06Q 20/20 705/22 |

(Continued)

*Primary Examiner* — Ashford S Hayles
(74) *Attorney, Agent, or Firm* — Treyz Law Group, P.C.; Jason Tsai; Joseph F. Guihan

(57) ABSTRACT

Methods for operating a portable electronic device to conduct mobile payment transactions are provided. The electronic device may include near field communications circuitry having a transmitter, a receiver, and a field detector for detecting a field from a merchant terminal. The receiver is typically idle. The receiver may be activated when the field detector detects that the electronic device is within the field of the merchant terminal. The transmitter may then be used to perform link establishment and data transfer. If the payment transaction fails for any reason, one or more hardware settings on the electronic device may be adjusted to help increase the chance of a successful transaction in a subsequent payment attempt. Another transaction may be attempted when the user moves the device out of the field and back into the field or may be performed automatically as long as the device is still within the field.

18 Claims, 11 Drawing Sheets

(56) References Cited

U.S. PATENT DOCUMENTS

| | | | |
|---|---|---|---|
| 2006/0022042 A1* | 2/2006 | Smets | G01R 31/302 235/451 |
| 2006/0022044 A1* | 2/2006 | Smets | G01R 31/302 235/451 |
| 2006/0119442 A1* | 6/2006 | Azam | H03L 7/093 331/16 |
| 2006/0211415 A1* | 9/2006 | Cassett | H04W 24/04 455/423 |
| 2006/0258323 A1* | 11/2006 | Hara | H04M 1/7253 455/343.2 |
| 2006/0265285 A1* | 11/2006 | Hamasaki | G06Q 20/20 705/16 |
| 2007/0001853 A1* | 1/2007 | Otranen | G06K 7/0008 340/572.1 |
| 2007/0159301 A1* | 7/2007 | Hirt | H04W 52/0216 340/10.1 |
| 2008/0081608 A1* | 4/2008 | Findikli | H04M 1/7253 455/425 |
| 2008/0162312 A1* | 7/2008 | Sklovsky | G06Q 20/32 705/35 |
| 2008/0180223 A1* | 7/2008 | Cato | G01R 31/2822 340/10.4 |
| 2008/0237345 A1* | 10/2008 | Moullette | H04B 5/02 235/438 |
| 2008/0246667 A1* | 10/2008 | Symons | G06K 19/0723 343/702 |
| 2009/0011706 A1 | 1/2009 | Wilson et al. | |
| 2009/0065571 A1* | 3/2009 | Jain | G06K 19/07739 235/379 |
| 2009/0108063 A1* | 4/2009 | Jain | G06K 7/10237 235/380 |
| 2009/0153331 A1* | 6/2009 | Inano | G06K 7/0008 340/572.1 |
| 2009/0166407 A1* | 7/2009 | Phillips | G06Q 20/3278 235/380 |
| 2009/0166419 A1* | 7/2009 | Patton | G06K 7/0008 235/439 |
| 2009/0237214 A1* | 9/2009 | Talach | G06Q 20/3278 340/10.1 |
| 2009/0291634 A1* | 11/2009 | Saarisalo | H04M 1/72527 455/41.1 |
| 2009/0321510 A1* | 12/2009 | Day | G06K 7/0008 235/375 |
| 2010/0015917 A1* | 1/2010 | Symons | H04B 5/0075 455/41.1 |
| 2010/0041332 A1* | 2/2010 | Flygh | G06F 1/1632 455/41.1 |
| 2010/0044444 A1* | 2/2010 | Jain | G06K 7/10237 235/492 |
| 2010/0066553 A1* | 3/2010 | Guichard | H04L 41/0803 340/654 |
| 2010/0176948 A1* | 7/2010 | Garrett | H04B 5/00 340/572.1 |
| 2010/0187308 A1* | 7/2010 | Busch-Sorensen | G06K 7/0008 235/439 |
| 2010/0243737 A1* | 9/2010 | Kargl | G06K 7/10178 235/439 |
| 2010/0264211 A1* | 10/2010 | Jain | G06F 1/1698 235/380 |
| 2010/0291871 A1* | 11/2010 | Butler | G06K 19/0701 455/41.1 |
| 2010/0311466 A1* | 12/2010 | Wilson | G06Q 20/341 455/557 |
| 2010/0330904 A1* | 12/2010 | Stougaard | H04L 67/12 455/41.1 |
| 2011/0042465 A1* | 2/2011 | Smets | G06K 7/0008 235/492 |
| 2011/0059694 A1* | 3/2011 | Audic | H04B 5/00 455/41.1 |
| 2011/0070834 A1* | 3/2011 | Griffin | G06K 7/0008 455/41.1 |
| 2011/0089232 A1* | 4/2011 | Kekicheff | G06Q 20/3552 235/380 |
| 2011/0111750 A1* | 5/2011 | Jacob | H04L 43/50 455/423 |
| 2011/0151900 A1* | 6/2011 | Yu | G06K 19/077 455/466 |
| 2011/0171996 A1* | 7/2011 | Narendra | G06K 19/0701 455/558 |
| 2011/0215921 A1* | 9/2011 | Ben Ayed | G08B 1/08 340/539.11 |
| 2011/0226853 A1* | 9/2011 | Soh | G06K 7/10237 235/380 |
| 2011/0260923 A1* | 10/2011 | Liao | G01S 11/06 342/458 |
| 2011/0275318 A1* | 11/2011 | Sato | H01Q 1/2208 455/41.1 |
| 2011/0280258 A1* | 11/2011 | Klingen | H04L 41/0816 370/437 |
| 2011/0312271 A1* | 12/2011 | Ma | H04B 5/00 455/41.1 |
| 2012/0052801 A1* | 3/2012 | Kulkarni | G06K 7/0008 455/41.1 |
| 2012/0079100 A1* | 3/2012 | McIntyre | G06F 11/0742 709/224 |
| 2012/0123880 A1* | 5/2012 | Craft | G06Q 20/20 705/16 |
| 2012/0143706 A1* | 6/2012 | Crake | G06Q 20/20 705/18 |
| 2012/0191400 A1* | 7/2012 | Sontakke | G01R 31/31724 702/119 |
| 2012/0217971 A1* | 8/2012 | Deluca | H04B 5/0043 324/426 |
| 2012/0248891 A1* | 10/2012 | Drennen | H02J 7/025 307/104 |
| 2012/0265685 A1* | 10/2012 | Brudnicki | G06Q 30/06 705/44 |
| 2012/0329389 A1* | 12/2012 | Royston | H04B 5/0062 455/41.1 |
| 2013/0002033 A1* | 1/2013 | Fuchs | H01Q 1/2216 307/104 |
| 2013/0005244 A1* | 1/2013 | Laws | H04B 5/0031 455/41.1 |
| 2013/0013352 A1* | 1/2013 | Fisher | G06Q 20/20 705/5 |
| 2013/0082536 A1* | 4/2013 | Taylor | H02J 7/025 307/104 |
| 2013/0098984 A1* | 4/2013 | Shenker | H04W 8/20 235/375 |
| 2013/0102247 A1* | 4/2013 | Hillan | G06K 7/10297 455/41.1 |
| 2013/0109305 A1* | 5/2013 | Savoj | G06K 7/0008 455/41.1 |
| 2013/0109446 A1* | 5/2013 | Phillips | H04B 17/29 455/575.1 |
| 2013/0143488 A1* | 6/2013 | Royston | G06K 7/10237 455/41.1 |
| 2013/0203349 A1* | 8/2013 | Hillan | H04B 5/02 455/41.1 |
| 2013/0297972 A1 | 11/2013 | Yokote et al. | |
| 2013/0324056 A1* | 12/2013 | Maguire | H01Q 1/245 455/73 |
| 2014/0040120 A1* | 2/2014 | Cho | G06Q 20/3278 705/39 |
| 2014/0053260 A1 | 2/2014 | Gupta et al. | |
| 2014/0087655 A1* | 3/2014 | Hall | H04B 5/0056 455/41.1 |
| 2014/0127993 A1* | 5/2014 | Frankland | G06K 19/0726 455/41.1 |
| 2014/0129425 A1* | 5/2014 | Yang | G06K 7/10158 705/39 |
| 2014/0150100 A1 | 5/2014 | Gupta et al. | |
| 2014/0176306 A1* | 6/2014 | Lee | G06K 7/10237 340/10.1 |
| 2014/0187153 A1* | 7/2014 | Zhu | H04B 5/02 455/41.1 |

(56) References Cited

U.S. PATENT DOCUMENTS

| | | | |
|---|---|---|---|
| 2014/0220890 A1* | 8/2014 | Bukovjan | G06Q 30/0242 455/41.1 |
| 2014/0263625 A1* | 9/2014 | Smets | G06Q 20/352 235/380 |
| 2014/0279428 A1* | 9/2014 | Holman | G06Q 20/10 705/39 |
| 2015/0118956 A1* | 4/2015 | Desai | H04B 5/0037 455/41.1 |
| 2015/0142589 A1* | 5/2015 | Jin | G06Q 20/206 705/18 |
| 2015/0180552 A1* | 6/2015 | Konanur | H01Q 7/005 455/41.1 |
| 2015/0249510 A1* | 9/2015 | Dhayni | G01R 31/31716 455/41.1 |
| 2015/0288464 A1* | 10/2015 | Tanner | H04B 17/15 455/41.1 |
| 2016/0181857 A1* | 6/2016 | Konanur | H01Q 7/00 320/108 |

\* cited by examiner

|  | DEFAULT | TRIAL #1 | TRIAL #2 | TRIAL #3 | ... |
|---|---|---|---|---|---|
| TX POWER BACKOFF AMOUNT | $\Delta P_0$ | $\Delta P_1$ | $\Delta P_0$ | $\Delta P_1$ | |
| PHASE OFFSET | $\Delta \theta_0$ | $\Delta \theta_0$ | $\Delta \theta_1$ | $\Delta \theta_1$ | |
| WAKE-UP THRESHOLD | $W_0$ | $W_0$ | $W_0$ | $W_0$ | |
| DAMPING COEFFICIENT | $K_0$ | $K_0$ | $K_0$ | $K_0$ | |
| FRAME DELAY TIME | $\Delta T_0$ | $\Delta T_0$ | $\Delta T_0$ | $\Delta T_1$ | |

FIG. 9

METHODS FOR ADJUSTING NEAR FIELD COMMUNICATIONS CIRCUITRY DURING MOBILE PAYMENT TRANSACTIONS

BACKGROUND

This relates generally to electronic devices, and more particularly, to operating electronic devices to conduct mobile payment transactions.

Portable electronic devices such as cellular telephones are sometimes provided with near field communications (NFC) circuitry that allows the electronic devices to perform contactless proximity-based communications with a corresponding NFC reader. Oftentimes, the NFC circuitry in a user device is used to carry out financial transactions or other secure data transactions that require the user device to verify and access a commerce credential such as a credit card credential. The secure data that is necessary for performing such mobile financial transactions is typically stored on a secure element within an electronic device.

Consider a scenario in which a user of an electronic device wishes to make a payment at a given NFC reader terminal. The electronic device is configured to operate using a particular hardware setting. For example, the electronic device may be configured to output signals at a constant output power level. Assuming all the financial information that is necessary to carry out the transaction has been approved and is in place, the financial transaction at the given NFC reader can still fail if the hardware setting of the electronic device is not correctly set. In the example above, the financial transaction will fail if the constant output power level is too high or too low. In such scenarios, repeated attempts to make a mobile payment transaction with the electronic device using the incorrect hardware setting will continue to fail at the NFC reader terminal.

SUMMARY

Methods for operating a portable user electronic device to conduct a mobile payment transaction at a merchant terminal are provided. In response to detecting that a mobile payment transaction has failed at the merchant terminal, the user device may be reconfigured using at least one new hardware control setting before attempting another payment transaction at the merchant terminal.

As examples, the user device may be reconfigured to perform a subsequent payment using a new transmit power control setting, using a new phase offset setting, use a new wakeup threshold setting (e.g., a setting that determines the maximum distance that the electronic device needs to be held from the merchant terminal in order for the electronic device to initiate the mobile payment transaction), using a new signal damping coefficient setting, using a new frame delay setting (e.g., a setting that sets forth a period of time that the user device needs to wait before sending an acknowledgement in response to receiving a request from the merchant terminal), etc. If desired, other types of hardware updates may be implemented.

In general, a mobile payment transaction may be initiated by placing the user device within a field that is generated by the merchant terminal. For a variety of reasons, it is possible for a mobile payment transaction to fail at the merchant terminal. In one suitable embodiment, the user may have to physically move the user device out of the field and back within the field to reattempt the transaction with the new hardware settings.

For example, the user device may have to wait for the electronic device to be moved out of the field before starting a timer that sets forth a period of time within which the electronic device can be used to reattempt the transaction. If the electronic device has been moved back within the field prior to the timer expiring, the electronic device may be reconfigured with one or more new hardware settings and another financial transaction is attempted. The new hardware settings for each attempt can be different and can be selected from a table of predetermined settings that is stored on the user device.

In another suitable embodiment, the user simply has to keep holding the user device in close proximity to the merchant setting until the payment is complete. In other words, the user device may be configured to automatically reattempt failed transactions using new hardware settings as long as the user device is still within the field of the merchant terminal. If, however, the user device is no longer within the field, the user device may not attempt another transaction until the user moves the device back into the field of a merchant terminal. While the user device is idle and not attempting any financial transactions, the hardware settings of the electronic device may be periodically reset so that the user device is configured to operate using default hardware settings when performing a subsequent mobile payment transaction.

Further features of the present invention, its nature and various advantages will be more apparent from the accompanying drawings and the following detailed description.

BRIEF DESCRIPTION OF THE DRAWINGS

FIG. 9 is a table of illustrative settings that can be used to control the NFC circuitry in the user device of FIG. 3 for consecutive financial transactions attempts in accordance with an embodiment.

DETAILED DESCRIPTION

Figure 1:
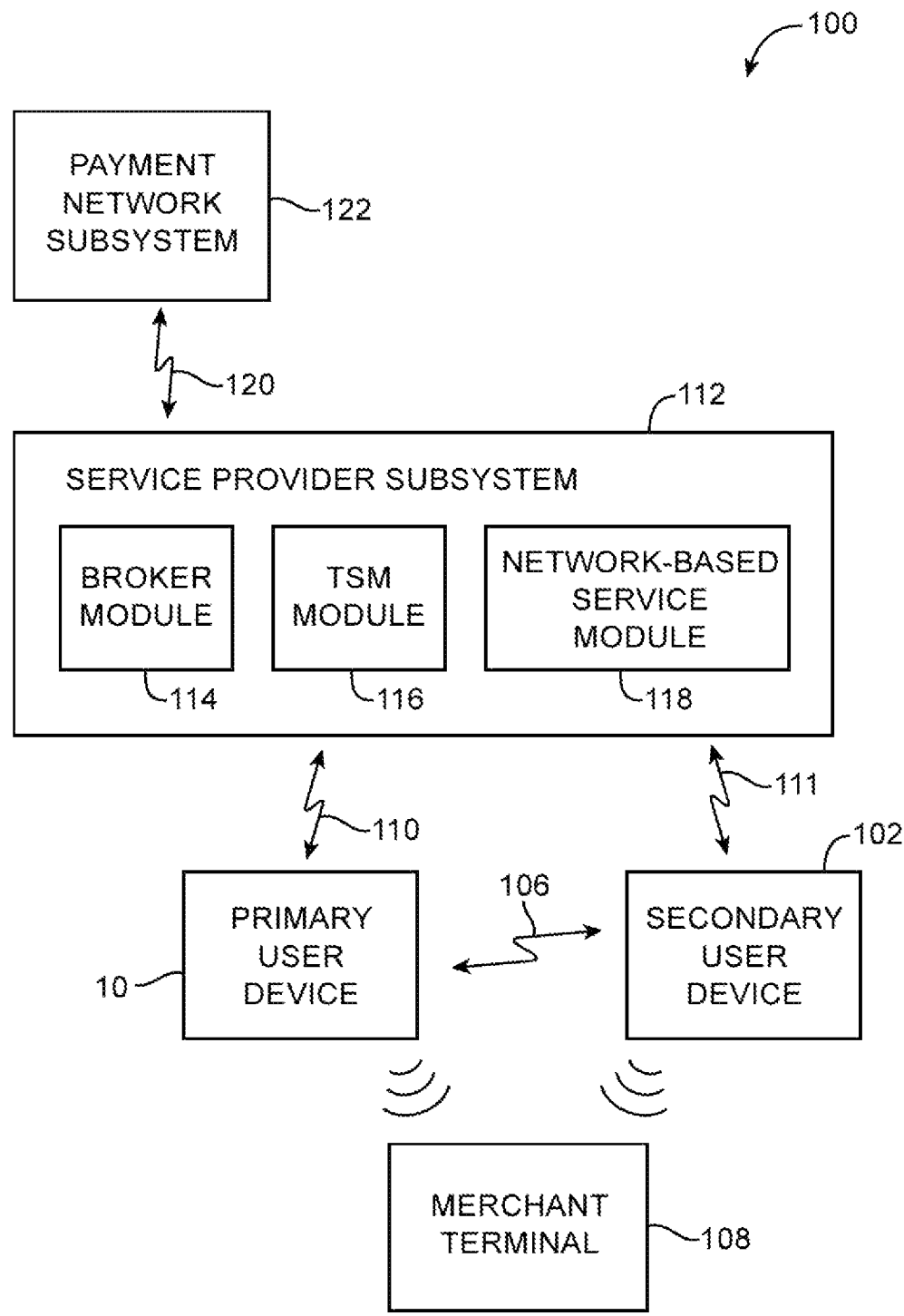
FIG. 1 is a diagram of an illustrative system for in which one or more user devices can be used to perform mobile payment transactions in accordance with an embodiment.

FIG. 1 shows a diagram of a system 100 in which credential information can be provisioned onto one or more electronic devices from a payment network subsystem 122 using a service provider subsystem 112. User devices that have been provisioned with commerce credentials from payment network subsystem 122 may be used to conduct a financial transaction with a merchant terminal such as merchant terminal 108. User devices may, for example, communicate with merchant terminal 108 via contactless proximity-based communications (e.g., using near field communications (NFC) standards). Terminal 108 (sometimes referred to as a "point-of-sale" terminal) may include an NFC reader for detecting, reading, or otherwise receiving information from a nearby electronic device.

For example, a user may hold a provisioned electronic device within range of merchant terminal 108 to initiate a commercial transaction. Actual physical contact between the user device and the merchant terminal need not be present. While the electronic device is within range of merchant terminal 108 (e.g., when the user device is within 10 cm of terminal 108, when the user device is within 5 cm of terminal 108, when the user device is within 1 cm of terminal 108, or when the distance between the user device and the merchant terminal has other suitable values), the electronic device may send a selected credential to merchant terminal 108. In response to receiving the selected credential, merchant terminal 108 may complete the payment by forwarding the received credential to a corresponding payment processor (not shown). The payment processor may utilize the user credential to complete the transaction with payment network subsystem 122. This example in which payment transactions are performed via NFC is merely illustrative and does not limit the scope of the present invention. If desired, financial transactions may be carried out over Bluetooth® communications links, personal area network (PAN) communications links, wireless local area network (WLAN) communications links, or other short-range wireless communications links.

Payment network subsystem 122 may be considered as part of a financial entity that includes a network of various issuing banks and/or acquiring banks (e.g., payment processors). Payment network subsystem 122 may serve as a generic payment card association (e.g., a credit card association) that partners with one or more issuing/acquiring banks that are associated with different brands of commerce credentials. Payment network subsystem 122 and associated issuing/acquiring banks may be a single entity or separate entities.

For example, American Express may be both a payment network subsystem and an issuing/acquiring bank subsystem. As another example, Visa and MasterCard may be a payment network subsystem that partners with other issuing/acquiring banks such as Bank of America, Wells Fargo, and Chase, just to name a few. The issuing bank may be the financial institution that assumes primary liability for each user's capability to pay off debts incurred using a particular brand of payment card. Various types of payment cards that can be issued may include but are not limited to: credit cards, debit cards, charge charges, stored-value cards, fleet cards, and gift cards.

User payment card credentials may be provisioned from such financial entities onto user devices using a service provider subsystem such as service provider subsystem 112. Service provider subsystem 112 may be configured to provide another layer of security and/or to provide a more seamless user experience. For example, service provider subsystem 112 may be part of a commercial service entity that offers various services to the user, which may include: an online store for selling/renting media to be played by the user device, an online store for selling/renting applications to be run on the user device, an online storage service for backing up and synchronizing data among multiple user devices, a remote device management service for tracking the location of the user device and remotely controlling that device, an online store that allows the user to purchase additional user devices or products (e.g., products manufactured by that commercial entity), etc. As another example, service provider subsystem 112 may be operated by a mobile network operator such as Verizon or AT&T.

In either scenario, service provider subsystem 112 may at least provide different users with their own personalized accounts for accessing the services offered by that commercial entity. Each user account may be associated with a personalized user identification (or account ID) and password that the user may use to log in into his/her account. Once logged in, the user may be presented with the opportunity to provision one or more commerce credentials (e.g., payment cards) onto the user device to enable the user device to purchase items using services offered by the commercial entity and/or to perform financial transactions at a merchant terminal 108.

In general, service provider subsystem 112 and payment network subsystem 122 are considered separate entities. Service provider subsystem 112 may serve as a commercial entity that leverages any known credential information associated with each of its user accounts to more securely determine whether a specific credential offered by payment network subsystem 122 ought to be provisioned onto a given user device. If desired, service provider subsystem 112 may also leverage its ability to configure or control various components of the user device (e.g., via software of firmware updates) in order to provide a more seamless experience for the user when he or she wants to provision a credential offered by payment network subsystem 122 onto a given user device.

As shown in FIG. 1, service provider subsystem 112 may include a broker module 114, a trusted service manager (TSM) module 116, and a network-based service module 118. Broker module 114 may serve to manage user authentication with a commercial entity user account and may also serve to manage the lifecycle and provisioning of credentials onto a user device. Broker module 114 may also be configured to control the user interface (e.g., the graphical user interface) that is displayed on the user device and to process any user inputs related to provisioning commerce credentials on the user device. When it is desired to provision a card onto the user device, broker 114 may send a notification to payment network subsystem 122 via path 120.

In response to receiving the notification from broker 114, payment network subsystem 122 may communicate directly with TSM module 116 to carry out credential provisioning operations on the user device. TSM 116 may serve to provide GlobalPlatform or other secure transactions based services so that TSM 116 can set up a secure channel between service provider subsystem 112 and a secure element within the user device. Commerce credential, payment card information, and/or other sensitive account data may then be conveyed to the secure element in the device via the secure channel. In general, TSM 116 may use public/private keys or other cryptographic schemes to ensure that communication between service provider subsystem 112 and the secure element within the user device is secure.

Network-based service module 118 may serve to allow users to store data such as music, photos, videos, contacts, multimedia messages, emails, calendars, notes, reminders, applications, documents, device settings, and other information on a network of computing servers so that data can be synchronized across multiple user devices (e.g., module 118 allows users to back up data that is stored on their devices onto servers associated with the service provider subsystem). This backup data can be used to restore a user device or to set up new user devices (as examples).

Network-based service module 118 may also be configured to allow users to find lost devices (sometimes referred to as a "Find My Device" feature), to share media among different devices, and/or to keep sensitive information (e.g., commerce credential information, website account login information, Wi-Fi® account information, etc.) up to date across different user devices. Any sensitive user information may be stored as part of a user "keychain" that can be stored on the user device(s) and/or on the network-based service module 118. Only the authorized user should have access to the keychain. Contents in the keychain may be protected using industry standard encryption techniques (e.g., using at least 128-bit AES encryption). Module 118 configured in this way is sometimes referred to as a "cloud" storage or cloud computing module.

Still referring to FIG. 1, a user may be in possession of multiple devices such as devices 10 and 102. Device 10 may be referred to as a "primary" user device, whereas device 102 may be referred to as a "secondary" user device. In general, the primary user device 10 may be provided with more functions than the secondary user device 102. For example, primary user device 10 may serve as the user's main device for use in accessing an entire array of services offered by service provider subsystem 112, for making telephone calls, for selecting new cards to be provisioned on one of devices 10 and 102, for capturing images, and for accessing the Internet, whereas secondary user device 102 may serve as an accessory device for use in accessing only a subset of the services provided by service provider subsystem 112.

Either one of primary user device 10 or secondary user device 102 can be used to perform a mobile payment transaction at merchant terminal 108. Each device that is capable of conducting such types of NFC-based financial transactions may be provided with a secure element. The secure element may serve as a tamper-resistant component (e.g., as a single chip or multichip secure microcontroller) that is capable of securely hosting applications and their confidential and cryptographic data in accordance with rules and security requirements set forth by well-identified trusted authorities such as GlobalPlatform. The secure element (SE) may be provided as a universal integrated circuit card (UICC), an embedded SE, a smart secure digital (SD) card, a microSD card, etc. Sensitive user information such as credit card information and other commerce credentials may be stored on the secure element. The secure element provides a secure domain that protects the user's credentials and processes desired payment transactions in a trusted environment without compromising the safety of the user's data. In general, each secure element may have its own unique identifier sometimes referred to herein as the SEID. No two secure elements should have the same SEID, and the SEID cannot be altered.

In one suitable arrangement, the user may operate the primary user device 10 to provision one or more payment cards directly on the primary user device. In such arrangements, credential information may be retrieved from the payment network subsystem 122 and/or the service provider subsystem 112 and may be downloaded to a secure element within device 10 via path 110. Path 110 between subsystem 112 and device 10 may be supported via cellular telephone radio communications protocols or other long-range wireless communications technologies and/or via Bluetooth®, IEEE 802.11 protocols—sometimes referred to as WiFi®, or other short-range wireless communications technologies.

In another suitable arrangement, the user may operate the primary user device 10 to indirectly provision one or more payment cards onto the secondary user device 102. In such scenarios, the provisioning of credentials onto the secondary device 102 may be managed using a secondary device credential management application (sometimes referred to as a "bridging" application) running on the primary user device 10. In such arrangements, payment network subsystem 122 may provide the desired payment card information that is then securely written into a secure element on the secondary device 102 via the primary user device 10 and path 106. The communications path 106 between primary user device 10 and secondary user device 102 may be supported via Bluetooth®, IEEE 802.11 protocols—sometimes referred to as WiFi®, or other short-range wireless communications technologies (as examples). In yet other suitable arrangement, secondary device 102 may communicate directly with service provider subsystem 112 to obtain commerce credentials using any suitable long-range or short-range wireless communications standards (as indicated by path 111).

Figure 2A:
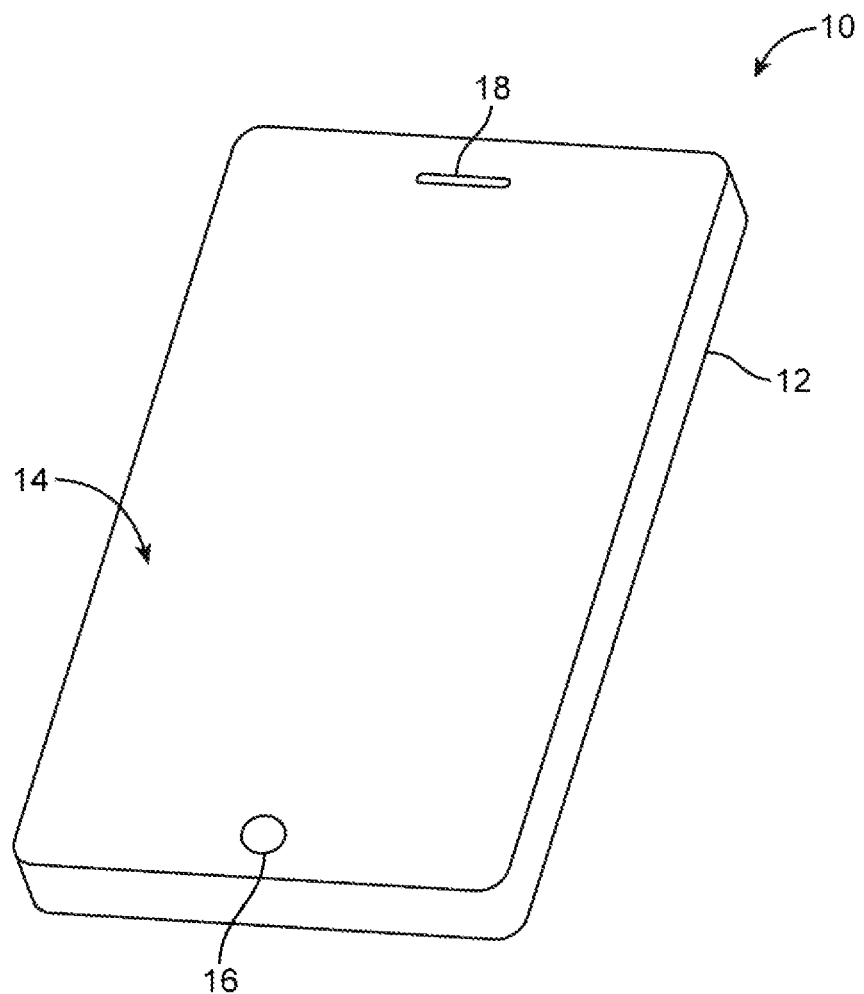
FIG. 2A is a perspective view of an illustrative primary user device in accordance with an embodiment.

FIG. 2A shows a perspective view of primary user device 10. Device 10 may be a portable device such as a cellular telephone, media player, tablet computer, or other portable computing device. The example of FIG. 2A is merely illustrative. Other configurations may be used for device 10, if desired. As shown in FIG. 2A, device 10 may include a display such as display 14. Display 14 has been mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18. Openings may be formed in housing 12 to form communications ports (e.g., an audio jack port, a digital data port, etc.).

Figure 2B:
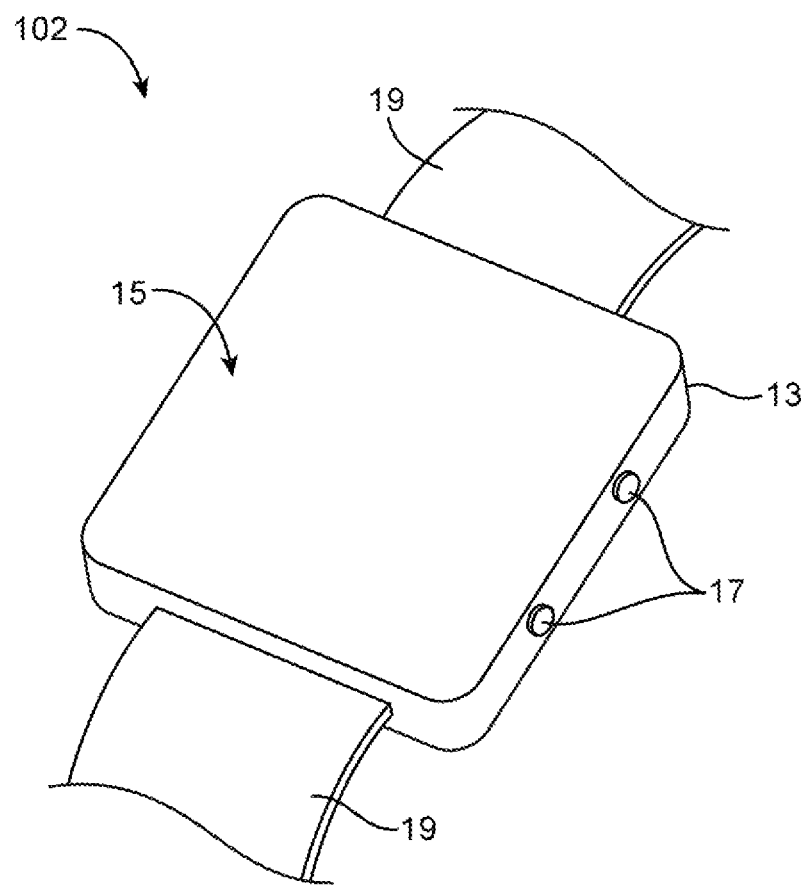
FIG. 2B is a perspective view of an illustrative secondary user device in accordance with an embodiment.

FIG. 2B shows a perspective view of a secondary user device 102. Electronic device 102 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In at least some embodiments, secondary user device 102 serves as an auxiliary device to primary device 10, where device 102 can be used to perform specialized functions for the user.

The example of FIG. 2B in which device 102 is shown as a wearable device such as a wrist-watch device with straps 19 is merely illustrative. As shown in FIG. 2B, device 102 may include a display such as display 15. Display 15 has been mounted in a housing such as housing 13. Housing 13, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 13 may be formed using a unibody configuration in which some or all of housing 13 is machined or molded as a single structure or may be formed using multiple structures (e.g., an internal frame structure, one or more structures that form exterior housing surfaces, etc.).

Display 15 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 15 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies. Display 15 may be protected using a display cover layer such as a layer of transparent glass or clear plastic.

Device 102 may have one or more buttons 17 which may be used to gather user input. Buttons 17 may be based on dome switches or other switch circuitry. Buttons 17 may include button members that form push buttons (e.g., momentary buttons), slider switches, rocker switches, etc. Device 10 may also have additional buttons, a speaker port, data ports such as a digital data port and an audio connector port, and/or other input-output devices, if desired. In some embodiments, at least one of buttons 17 on the secondary user device 102 may be used to enable device 102 for a secure mobile transaction.

Figure 3:
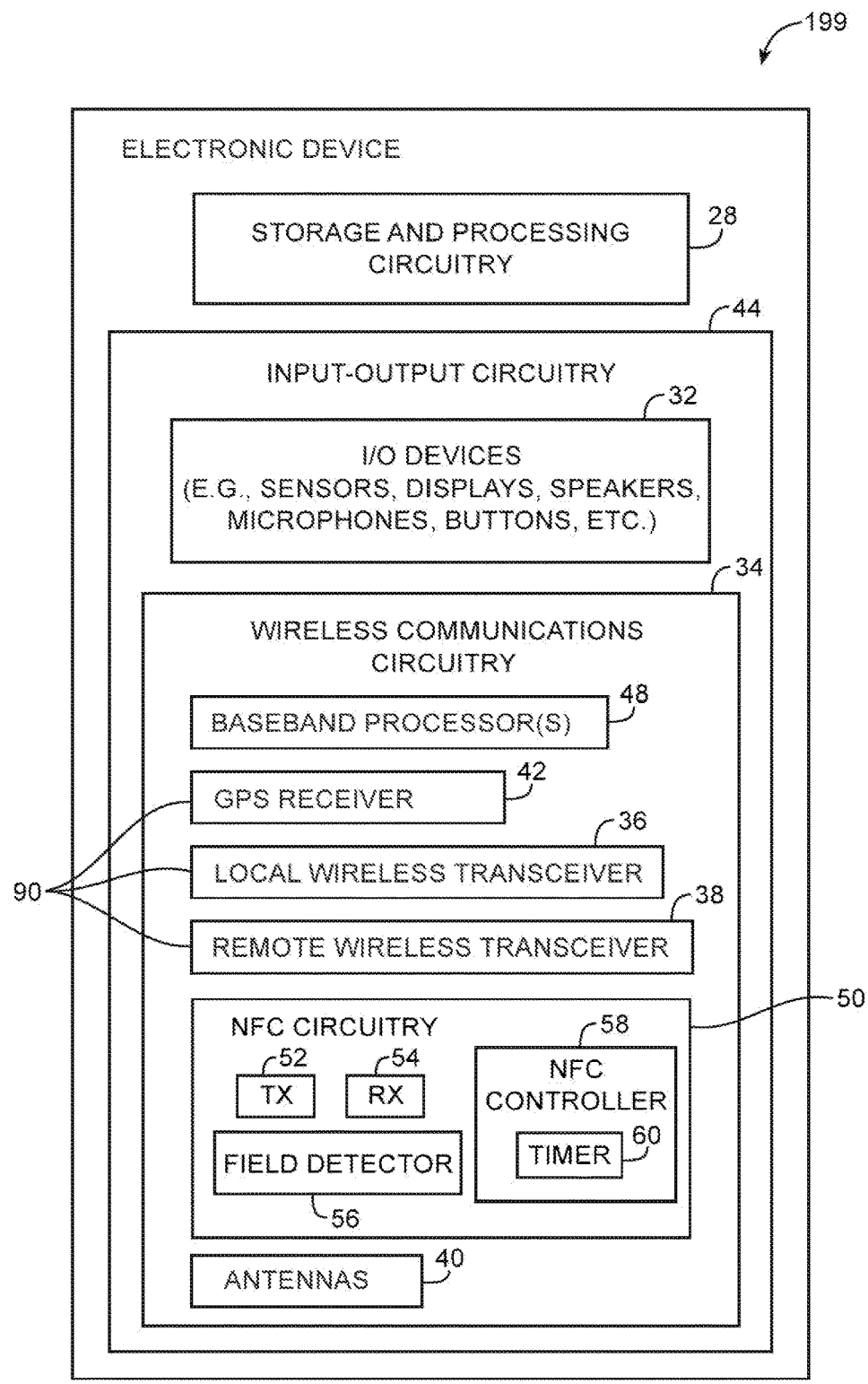
FIG. 3 is a schematic diagram of illustrative circuitry within a user device that can be used to perform mobile payment transactions in accordance with an embodiment.

A schematic diagram showing illustrative components that may be used in a device such as device 199 is shown in FIG. 3. Device 199 may be a user device of the type described in connection with FIG. 2A, FIG. 2B, or other suitable electronic device. As shown in FIG. 3, device 199 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 199. This processing circuitry may be based on one or more microprocessors, microcontrollers, digital signal processors, application specific integrated circuits, etc.

Storage and processing circuitry 28 may be used to run software on device 199, such as internet browsing applications, voice-over-internet-protocol (VOIP) telephone call applications, email applications, media playback applications, operating system functions, secondary device credential management applications, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, etc.

Input-output circuitry 44 may include input-output devices 32. Input-output devices 32 may be used to allow data to be supplied to device 199 and to allow data to be provided from device 199 to external devices. Input-output devices 32 may include user interface devices, data port devices, and other input-output components. For example, input-output devices 32 may include touch screens, displays without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, etc.

Input-output circuitry 44 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36 and 38. Transceiver circuitry 36 may be wireless local area network transceiver circuitry that may handle 2.4 GHz and 5 GHz bands for WiFi® (IEEE 802.11) communications and that may handle the 2.4 GHz Bluetooth® communications band. Circuitry 34 may use cellular telephone transceiver circuitry 38 for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples). Circuitry 38 may handle voice data and non-voice data.

Wireless communications circuitry 34 may also include satellite navigation system circuitry such as global positioning system (GPS) receiver circuitry 42 for receiving GPS signals at 1575 MHz or for handling other satellite positioning data. Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless circuitry 34 may also include near field communications (NFC) circuitry 50. Near field communications circuitry 50 may produce and receive near field communications signals to support communications between device 10 and a near field communications reader or other external near field communications equipment. Near field communications may be supported using loop antennas (e.g., to support inductive near field communications in which a loop antenna in device 10 is electromagnetically near field coupled to a corresponding loop antenna in a near field communications reader). Near field communications links typically are generally formed over distances of 20 cm or less (i.e., device 10 must be placed in the vicinity of the near field communications reader for effective communications).

In at least some embodiments, NFC circuitry 50 may include a transmitter circuit 52 and a receiver circuit 54 for sending near field signals and for receiving near field signals to and from a corresponding NFC reader, a field detector such as field detector 56 for detecting the presence of the electromagnetic field from the NFC reader, and an associated NFC controller circuit 58. NFC controller 58 may be configured to control the operation of NFC circuitry 50. In some arrangements, the NFC controller may also serve to communicate with storage and processing circuitry 28 and with a secure element on device 199 (not shown) during an NFC-based commercial transaction. In the example of FIG. 3, NFC controller 58 includes a timer 60 that can be used to limit the amount of time the user has to complete a mobile payment.

Transceiver circuitry 90 and NFC circuitry 50 may be coupled to one or more baseband processors 48. Baseband processor 48 may receive digital data to be transmitted from circuitry 28 and may supply corresponding signals to at least one of wireless transceiver circuits 90 for wireless transmission. During signal reception operations, transceiver circuitry 90 and NFC circuitry 50 may receive radio-frequency signals from external sources (e.g., wireless base stations, wireless access points, GPS satellites, NFC readers etc.). Baseband processor 48 may convert signals received from circuitries 90 and 50 into corresponding digital data for circuitry 28. The functions of baseband processor 48 may be provided by one or more integrated circuits. Baseband processor 48 is sometimes considered to be part of storage and processing circuitry 28.

Wireless communications circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna. In addition to supporting cellular telephone communications, wireless local area network communications, and other far-field wireless communications, the structures of antennas 40 may be used in supporting near field communications. The structures of antennas 40 may also be used in gathering proximity sensor signals (e.g., capacitive proximity sensor signals).

Radio-frequency transceiver circuitry 90 does not handle near field communications signals and is therefore sometimes referred to as "far field" communications circuitry or non-near field communications circuitry (e.g., transceiver circuitry 90 may handle non-near field communications frequencies such as frequencies above 700 MHz or other suitable frequency). Near field communications transceiver circuitry 50 may be used in handling near field communications. With one suitable arrangement, near field communications can be supported using signals at a frequency of 13.56 MHz. Other near field communications bands may be supported using the structures of antennas 40 if desired.

Figure 4:
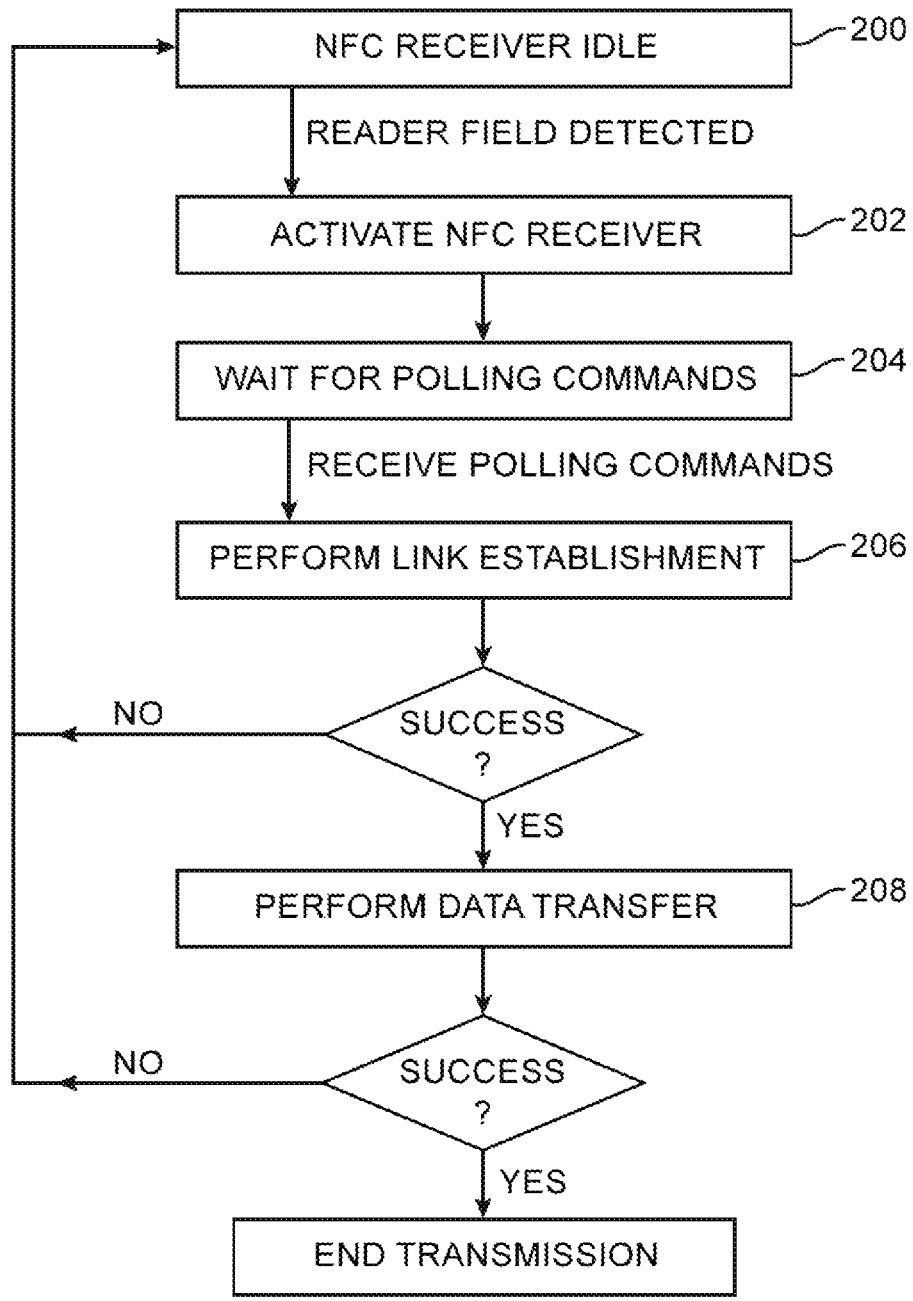
FIG. 4 is a flow chart of conventional steps involved in operating an electronic device to conduct financial transactions.

FIG. 4 shows conventional steps for operating an electronic device when a user attempts to use the electronic device to perform a payment transaction at a point-of-sale terminal. The electronic device may include an NFC receiver that is nominally in the idle state (at step 200). In response to detecting a field from a nearby point-of-sale terminal, the NFC receiver is activated (at step 202).

At step 204, the electronic device waits for polling commands from the point-of-sale terminal. In general, polling commands are commands that can be sent by a point-of-sale terminal during an NFC transaction to help establish a link between the electronic device and the point-of-sale terminal.

In response to receiving polling commands from the terminal, the electronic device may proceed to establish an NFC-protocol-compliant link with the point-of-sale terminal (step 206). If the link establishment operation is unsuccessful, processing may loop back to the default idle state 200. If the link establishment operation is successful, step 208 may be subsequently performed to carry out data transfer between the electronic device and the point-of-sale terminal (i.e., commerce credential information is sent from the electronic device to the payment terminal).

If the data transfer is unsuccessful, processing may loop back to the default idle state 200. If the link establishment operation is successful, an alert may be sent to the user to signify the end of transmission and the successful completion of the financial transaction.

The steps of FIG. 4 may be limiting in the sense that unsuccessful transactions do not result in any useful or remedial action being taken by the electronic device. For example, if the user attempts to make a second payment attempt immediately following a first failed attempt, the chance that the second payment attempt will fail is as high as the first attempt. It would therefore be desirable to provide an improved way of operating an electronic device in response to failed payment attempts.

In accordance with one suitable arrangement, an electronic user device such as user device 199 of FIG. 3 may be used at a merchant terminal 108 (see, FIG. 1) to carry out mobile payment transactions and may be configured to use new hardware settings in response to failed transaction attempts. Reconfiguring device 199 with new settings and/or taking other remedial action can help improve the chance of success for subsequent transaction attempts by the user.

Figure 5:
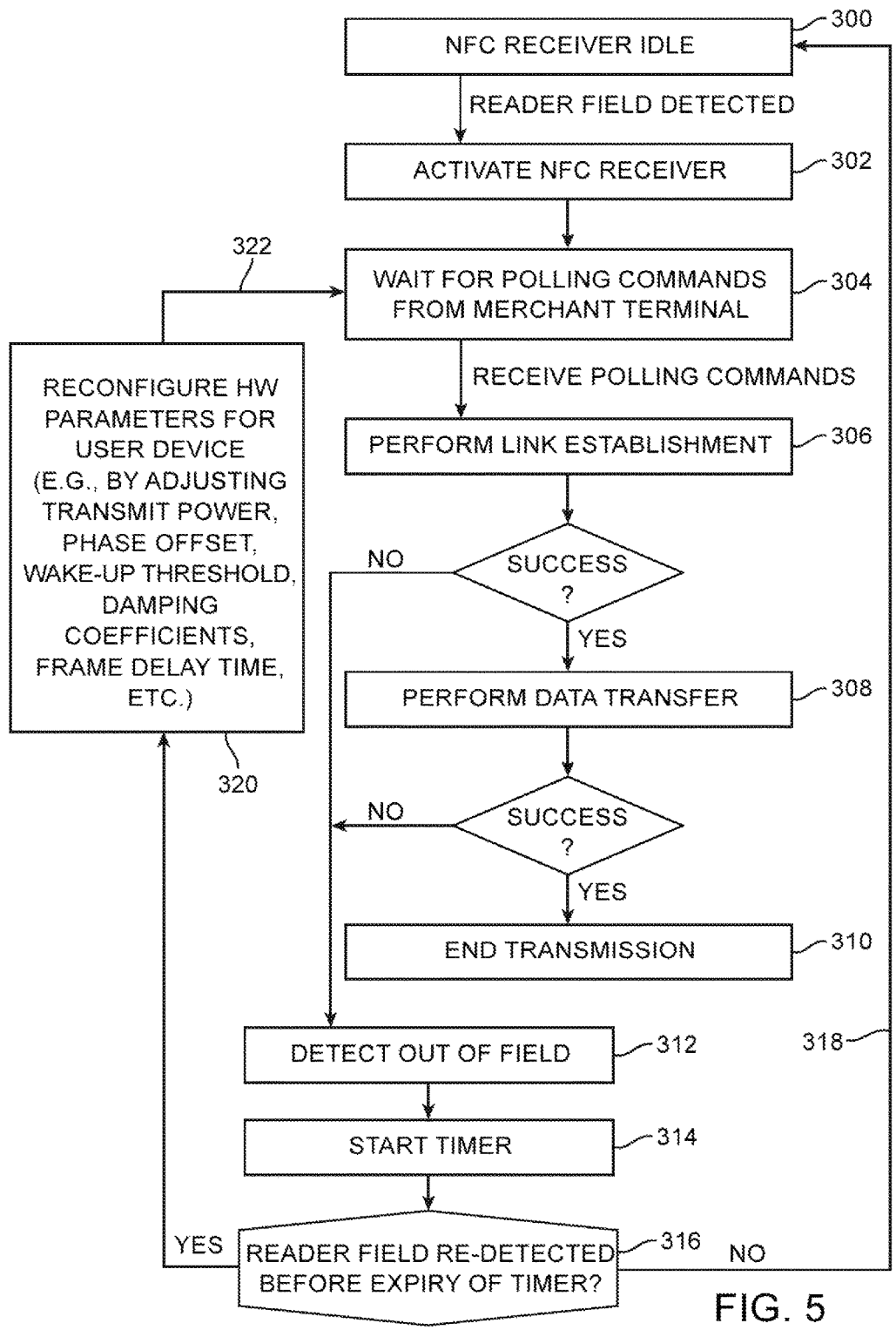
FIG. 5 is a flow chart of illustrative steps involved in operating an electronic device to conduct financial transactions in accordance with an embodiment.

FIG. 5 is a flow chart of illustrative steps for operating device 199 to conduct mobile payment transactions. At step 300, near field communications receiver 54 may be placed in the idle state while field detector 56 serves to detect a nearby electromagnetic field (see, FIG. 3). When a user brings device 199 in close proximity to a merchant terminal (e.g., when the user device is within 10 cm of the payment terminal, when the user device is within 5 cm of the payment terminal, when the user device is within 1 cm of the payment terminal, or when the distance between the user device and the merchant terminal has other suitable values), field detector 56 may detect a field from the merchant terminal and may output a corresponding control signal that activates receiver 54 (at step 302).

Once the NFC receiver 54 is activated, receiver 54 may wait for polling commands to be sent from the merchant terminal or other suitable NFC reader or external equipment (step 304). In general, polling commands sent from a merchant terminal to an electronic device may include a series of requests and acknowledgement messages that let both of the communicating devices know what type of link or protocol should be used in establishing a protocol-compliant link between the pair of communicating devices.

When device 199 receives appropriate polling commands from the merchant terminal, device 199 may be configured to perform corresponding link establishment operations (step 306). During the link establishment operations, device identifier (ID) information, anti-collision command information, and other link attribute information may be shared between device 199 and the merchant terminal.

If the link can be successfully established, device 199 may then be used to transfer all necessary data for completing a financial transaction to the merchant terminal (step 308). For example, device 199 may be configured to access one or more commerce credentials that are stored on a secure element within device 199 and to transfer the commerce credentials to the merchant terminal. The commerce credentials may be encrypted such that only the payment network subsystem (FIG. 1) can verify the validity of the commerce credentials. If the data transfer is successful (e.g., if the mobile payment attempt has been completed), data transmission and the link that was previously established between device 199 and the merchant terminal may be terminated (step 310).

If, however, the link establishment operations during step 306 and the data transfer operations during step 308 are unsuccessful, processing may proceed to step 312. At step 312, field detecting circuit 56 may be used to detect that device 199 has been moved out of the field emitted by the merchant terminal. This out-of-field detection may be a result of the user moving device 199 away from the NFC reader after an unsuccessful attempt.

Immediately in response to the out-of-field detection, timer 60 on the NFC controller 58 may be (re)started to monitor how much time has elapsed since the last failed attempt (step 314). For example, the user may be given a five second period to reattempt payment before completely timing out. As another example, the user may be given a ten second period to reattempt payment before timing out. If the user fails to bring device 199 back within the field of the NFC reader prior to the timer expiring, processing may loop back to the idle state 300 without any change to the wireless communications circuitry, as indicated by path 318. In general, other suitable expiry time periods may be implemented for timer 60.

If, however, the user brings device 199 back within the field of the NFC reader prior to the expiry of timer 60, device 199 may proceed to automatically reconfigure one or more hardware parameters for device 199 (step 320). For example, device 199 may be configured to change its near field communications transmit power settings, transmit phase offset settings, wake-up thresholds for determining when receiver 54 should be awaken from the idle state, damping coefficients for transmit signals, frame delay time, just to name a few. These examples are merely illustrative and do not serve to limit the scope of the present invention. In general, device 199 may be provided with updated operating settings at step 320 to help increase the chance of success in a subsequent transactions attempt. Once device 199 has been reconfigured with the new hardware settings, processing may loop back to step 304 to perform link establish and/or data transfer with the new NFC hardware settings (as indicated by path 322).

Figure 6A:
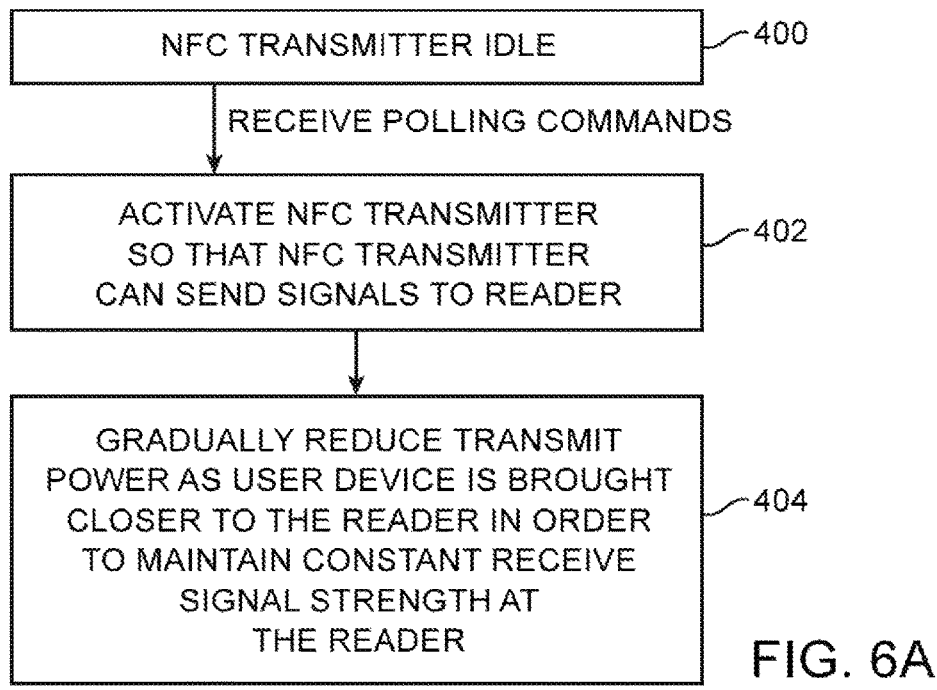
FIGS. 6A, 6B, and 6C show steps and diagrams illustrating how the transmit power level can be controlled during an NFC-based transaction in accordance with an embodiment.
Figure 6B:
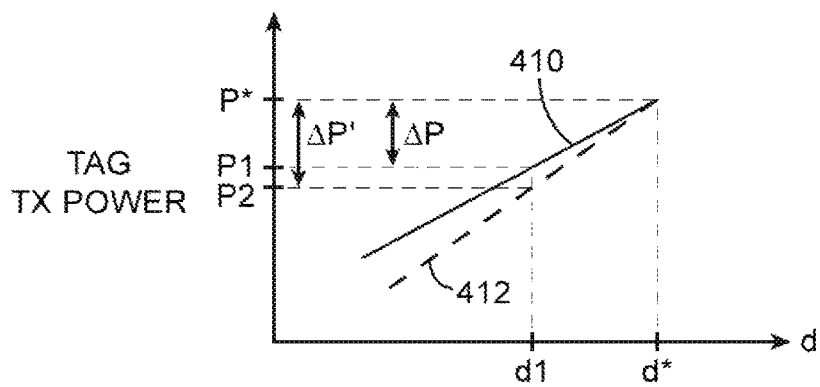
Figure 6C:
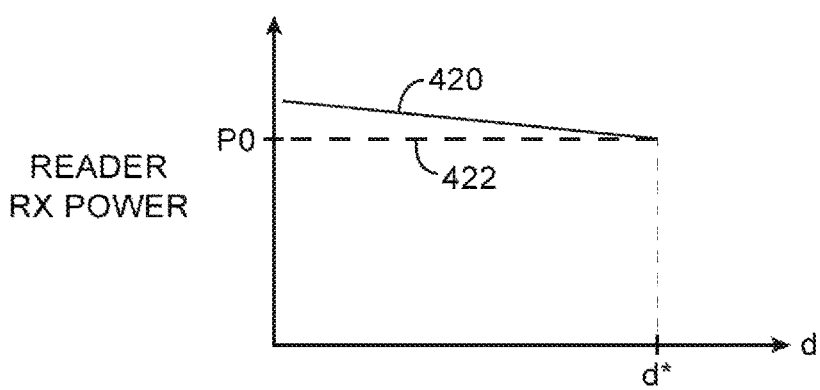

FIGS. 6A, 6B, and 6C illustrating how near field communications circuitry transmit power settings can be adjusted during an NFC-based transaction in accordance with an embodiment. In particular, FIG. 6A shows steps involved in controlling NFC transmitter 52. At step 400, transmitter 52 may be idle. In response to the user device receiving polling commands from the merchant terminal, transmitter 52 may be activated so that transmitter 52 can send signals to the NFC reader at the merchant terminal (step 402). In other words, the NFC transmitter should only start sending signals when polling commands have been received.

At step 404, the transmit power of transmitter 52 may be gradually reduced as the user device is brought closer to the NFC reader in order to maintain a constant receive signal strength at the NFC reader. If the transmit power of transmitter 52 were not reduced as the user device is brought closer and closer to the NFC reader, the actual receive signal strength may gradually increase as the distance between the user device and the NFC reader decreases. In such scenarios, it is possible that the actual receive signal strength at the reader overwhelms and saturates the NFC reader, which can result in a transaction failure. It is therefore generally desirable for transmitter 52 to systematically decrease its gain settings as the distance between the user device and the NFC reader is reduced. The distance between the user device and the NFC reader at the merchant terminal can be sensed using detector 56 or using other suitable distance measurement device (not shown). The control of power or gain at transmitter 52 as described above is sometimes referred to as automatic gain control (AGC) or automatic power control (APC).

FIG. 6B shows the transmit (Tx) power of transmitter 52 at the user device (sometimes referred to herein as the NFC "tag") plotted against the distance d separating the user NFC tag and the merchant NFC reader. In particular, line 410 may represent the transmit characteristic of transmitter 52 configured using a first automatic gain control setting, whereas line 412 may represent the transmit characteristic of transmitter 52 configured using a second automatic gain control setting.

In the example of FIG. 6B, either setting will configure the near field communication transmitter to output signals at an initial transmit power level P* when the distance between the user device and the merchant terminal is equal to d*. Distance d* may be equal to the distance at which the user device needs to be held with respect to the merchant terminal so that the field detector 56 begins to detect the field from the merchant terminal and activates transmitter 52 (see, FIG. 3). In the scenario in which the first automatic power control (APC) setting is used (e.g., line 410), the output power may be decreased by amount ΔP when the distance separating the user device and the NFC reader is reduced from d* to d1. The rate by which the power is reduced as a function of distance d determines the slope of line 410 and is sometimes referred to as the power back-off offset amount.

In the scenario in which the second automatic power control (APC) setting is used (e.g., line 412), the output power may be decreased by amount ΔP' when the distance separating the user device and the NFC reader is reduced from d* to d1. Referring to FIG. 6B, since ΔP' is shown to be greater than ΔP, the power back-off offset amount for line 412 is said to be greater than the power back-off offset amount for line 410. In general, the power back-off offset rate can be decreased in order to not oversaturate the NFC reader when a user tag is brought closer and closer to the reader. This is illustrated in FIG. 6C, which plots the receive (Rx) signal strength at the NFC reader as a function of the distance d separating the user device and the point-of-sale terminal. In particular, line 420 represents the receive profile associated with a user device that has been configured using the first APC setting, whereas line 422 represents the receive profile associated with a user device that has been configured using the second APC setting. As shown in FIG. 6C, line 420 actually increases as distance d is decreased below d* whereas line 422 stays constant.

It is generally desirable to maintain a constant receive power level at the merchant terminal. In other words, the second APC setting may result in a successful mobile payment transaction being performed at the merchant terminal, whereas the first APC setting may overload the NFC reader and result in a failed transaction attempt. Due to the existence of many different types of near field communications readers that exist in practice today, it may be challenging to predict which APC setting is suitable for a given reader. One way of operating a user device in this type of environment is to monotonically reduce the transmitter power back-off offset with each successive transaction attempt in hopes of converging at an automatic power control setting with a suitable power back-off offset amount that provides a constant receive power level at the NFC reader.

The example of adjusting the output power level changes the amplitude of the near field signals. In another suitable arrangement, the phase of the signals transmitted by transmitter 52 can be adjusted to help increase the chance of a successful transaction. It is generally desirable for the phase of the signals transmitted by the user device to be in phase with the phase of the signals transmitted by the NFC reader. Due to process variations and various other sources of path delays, the phase of the signals output by transmitter 52 may be slightly out of sync. In such scenarios, adjusting the phase offset of signals output by transmitter 52 can help ensure proper phase alignment between signals transmitted at the user device and at the near field communications reader device.

In another suitable arrangement, the user device may be configured to adjust its wakeup threshold. The wakeup threshold of the near field communications circuitry may be a metric that is inversely proportional to the distance at which the user tag is able to detect the presence of the reader field. For example, a user tag that is able to detect a reader field from 7 cm away (e.g., a user device that wakes up the NFC transmitter when the device is within 7 cm of the reader) has a lower wakeup threshold than a user tag that is only able to detect a reader field from 5 cm away (e.g., a user device that wakes up the NFC transmitter only when the device is within 5 cm of the reader).

The wakeup threshold may be of concern in scenarios where the near field communications transmitter 52 and the near field communications receiver 54 in the user device have mismatched performance levels (i.e., when the receiver is less efficient than the transmitter or vice versa). In general, it may be desirable to start with a relatively lower wakeup threshold and incrementally increase the wakeup threshold with each failed attempt (e.g., to decrease the operability distance requirement following each failed transaction). Doing so ensures that the user tag has to be brought closer to the merchant reader before a transaction can be initiated.

Figure 7A:
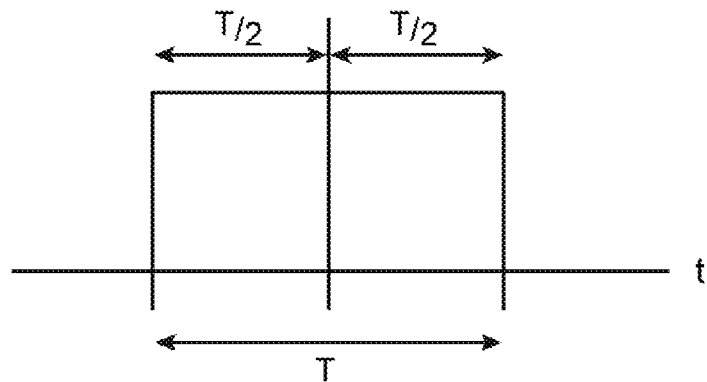
FIGS. 7A, 7B, and 7C show diagrams illustrating the effect of damping coefficients on transmitted signals in accordance with an embodiment.

In another suitable arrangement, the user device may be configured to adjust its transmit signal damping coefficient. In some near field communications standards such as the ISO/IEC 14443 standard, only a portion of the in-band signals should be transmitted over the air. FIG. 7A shows how a transmit signal can have a first portion T/2 and a second portion T/2, for a total of duration T. The ISO/IEC 14443 may, for example, specify that signals should only be allowed to transmit in the first half portion.

Figure 7B:
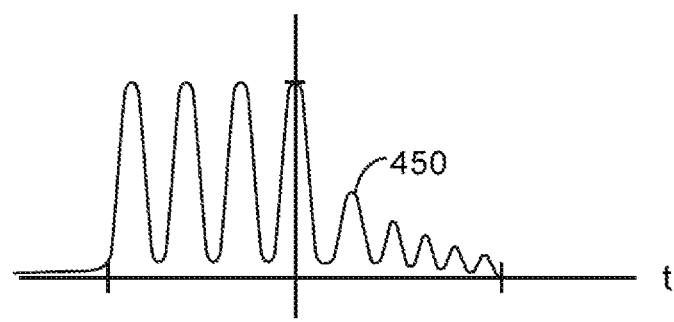
Figure 7C:
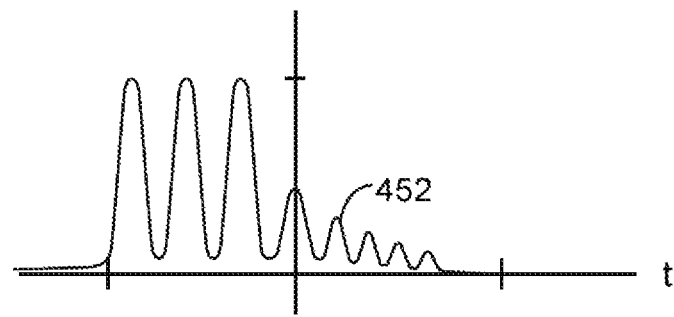

FIG. 7B shows a scenario where a transmit signal is subject to a first damping coefficient. As shown in portion 450 of FIG. 7B, signals in the second half portion is reduced at a first rate. FIG. 7C shows another scenario where a transmit signal is subject to a second damping coefficient that is greater than the first damping coefficient. As shown in portion 452 of FIG. 7C, signals in the second half portion is reduced at a second rate that is greater than the first rate. In the example of FIG. 7C, over-damping the transmit signals may actually reduce a portion of the signals in the first half portion. This may or may not be desirable for the NFC reader. In general, it may be desirable to start with a relatively lower damping coefficient and incrementally increase the damping strength with each failed attempt. Doing so ensures that signals in the first half portion is not excessively attenuated so as to overly degrade in-band energy levels. The example of FIGS. 7A, 7B, and 7C is merely illustrative. This concept can be extended to other near field communications standards/protocols that require at least a portion of the in-band signals to be attenuated or amplified.

Figure 8A:
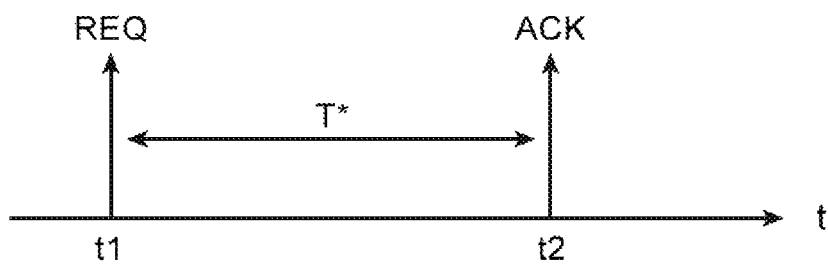
FIGS. 8A, 8B, and 8C show diagrams illustrating how frame delay time can be adjusted in accordance with an embodiment.

In another suitable arrangement, the user device may be configured to adjust the frame delay time. The frame delay time may be defined by the amount of time delay that should be present between the time at which a message is received at the user device and the time at which a corresponding message is transmitted at the user device in response. As shown in the example of FIG. 8A, a request REQ may be sent by the NFC reader at time t1, whereas a corresponding acknowledge ACK to the request may be sent by the user tag at time t2. The time delay between t1 and t2 may be referred to herein as the frame delay time T*.

Figure 8B:
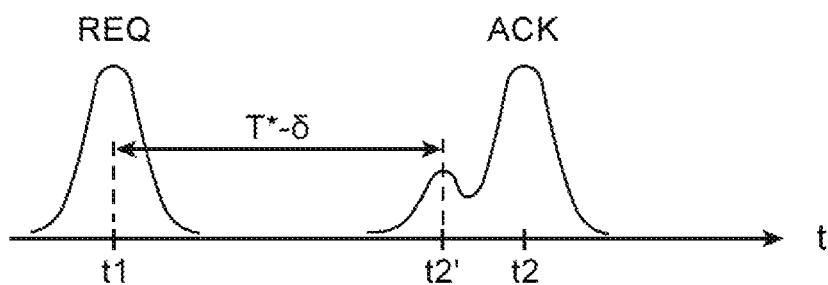

The frame delay time may be defined by the near field communications protocol that is currently used in handling the wireless communications between the user device and the merchant terminal. FIG. 8B shows a scenario in which some noise/interference in the ACK signal can trigger a premature reading of the ACK signal at time t2', which can result in a frame delay time that has been reduced by δ. This unintended deviation in frame delay time from the specified value can cause a transaction failure.

Figure 8C:
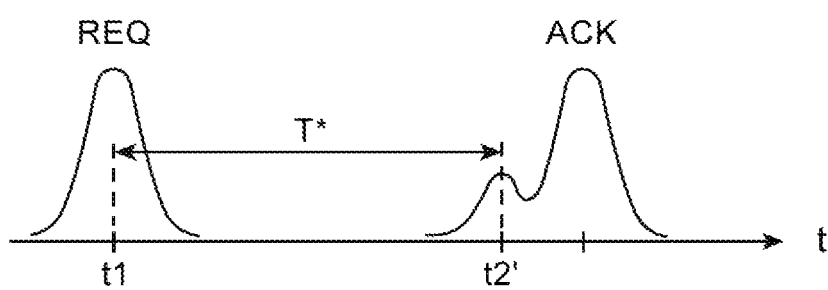

In such scenarios, it may be desirable to slightly delay the sending of the ACK signal so that the detected frame delay time is equal to the required frame delay time T* (see, e.g., FIG. 8C). As shown in FIG. 8C, shifting the ACK signal can help compensate for the presence of the sideband noise/interference. The example of FIGS. 8B and 8C are merely illustrative. In general, the user device may be configured to introduce positive delay (e.g., by sending out signals later in time) or to introduce negative delay (e.g., by sending out signals earlier in time) to help obtain a suitable frame delay time for a successful NFC-based transaction.

FIG. 9 shows a table 500 of predetermined operating settings that can be used to configure a user device when performing consecutive mobile payment attempts. The predetermined settings in table 500 may be stored on the user device. As shown in FIG. 9, the user device may be initialized to a default transmit power back-off setting $\Delta P_0$, a default phase offset setting $\Delta \theta_0$, a default wakeup threshold setting $W_0$, a default signal damping coefficient $K_0$, and a default frame delay setting $\Delta T_0$. If for any reason the mobile payment transaction is not successful and the user reattempts within the expiry period another transaction, the user device may be reconfigured using a new trial setting (see, step 320 in FIG. 5).

In the example of FIG. 9, the first reattempt (indicated as trial #1) may utilize an updated transmit power back-off setting $\Delta P_1$ while keeping all other settings the same. If trial #1 is again unsuccessful, the user may be given the opportunity to try again within a predetermined amount of time. If the user reattempts for a second time (indicated as trial #2), the user device may be reconfigured with a new phase offset setting $\Delta \theta_1$ while keeping all other settings equal. If trial #2 is again unsuccessful, the user may elect to try again within the predetermined expiry period. If the user reattempts for a third time (indicated as trial #3), the user device may be reconfigured with transmit power back-off setting $\Delta P_1$, with phase offset setting $\Delta \theta_1$, and with a new frame delay time $\Delta T_1$.

The values in table 500 are merely illustrative and do not serve to limit the scope of the present invention. In general, the user device can be configured to change one or more settings, two or more settings, three or more settings, or any number of hardware settings at step 320 of FIG. 5. If desired, the device can also limit the number of attempts by the user. In yet other suitable scenarios, the device may detect that a certain type of NFC reader is at the merchant terminal and automatically select a corresponding hardware setting in table 500 that is suitable for that particular type of NFC reader. Other ways of managing and changing the operating setting of a user device to help increase the chance of a successful mobile payment transaction at the merchant terminal may be implemented.

Figure 10:
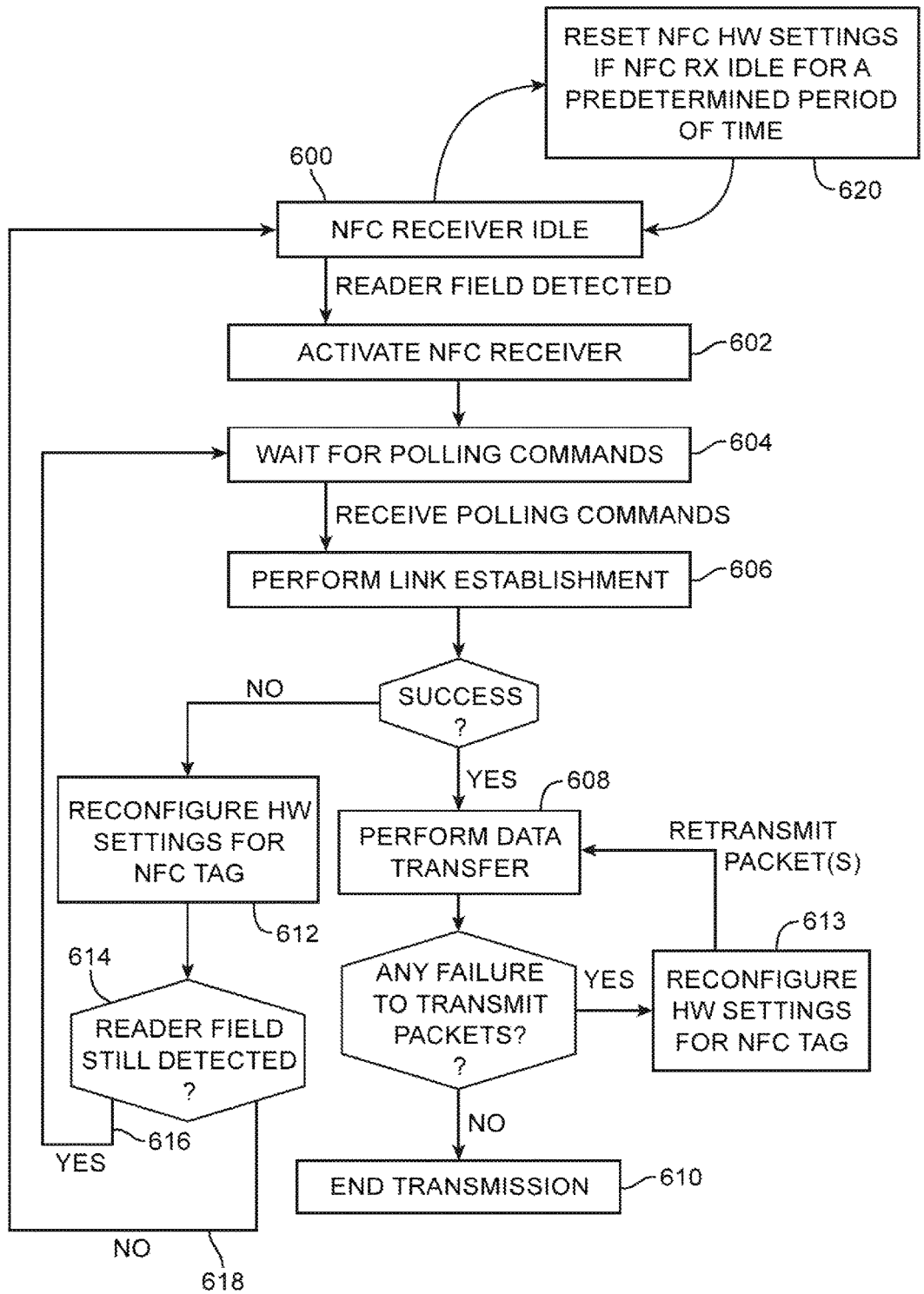
FIG. 10 is a flow chart of illustrative steps involved in operating an electronic device to conduct financial transactions without requiring the user to move the electronic device out of field in accordance with an embodiment.

In FIG. 5, each reattempt and reconfiguration of the user device with new operating settings is triggered by the motion of the user bringing the user tag out of the reader field and then brining the tag back into the reader field. FIG. 10 is a flow chart of illustrative steps showing another suitable embodiment in which new hardware settings can automatically be updated in response to a failed transaction without requiring the user to move the user tag out of the read field.

At step 600, near field communications receiver 54 may be placed in the idle state while field detector 56 serves to detect a nearby electromagnetic field (see, device components in FIG. 3). When a user brings device 199 into close proximity to a merchant terminal (e.g., when the user device is within 10 cm of the payment terminal, when the user device is within 5 cm of the payment terminal, when the user device is within 1 cm of the payment terminal, or when the distance between the user device and the merchant terminal has other suitable values), field detector 56 may detect a field from the merchant terminal and may output a corresponding control signal that activates receiver 54 (at step 602).

Once the NFC receiver 54 is activated, receiver 54 may wait for polling commands to be sent from the merchant terminal or other suitable NFC reader or external equipment (step 604). When device 199 receives appropriate polling commands from the merchant terminal, device 199 may be configured to perform corresponding link establishment operations (step 606). During the link establishment operations, device identifier (ID) information, anti-collision command information, and other link attribute information may be shared between device 199 and the merchant terminal.

If the link can be successfully established, device 199 may then be used to transfer all necessary data for completing a financial transaction to the merchant terminal (step 608). For example, device 199 may be configured to access one or more commerce credentials that are stored on a secure element within device 199 and to transfer the commerce credentials to the merchant terminal. The commerce credentials may be encrypted such that only the payment network subsystem (FIG. 1) can verify the validity of the commerce credentials. If the data transfer is successful (e.g., if the mobile payment attempt has been completed), data transmission and the link that was previously established between device 199 and the merchant terminal may be terminated (step 610).

If, however, the link establishment operations during step 606 are unsuccessful, processing may proceed to step 612. At step 612, device 199 may automatically reconfigure one or more hardware parameters on device 199 (e.g., by reconfiguring device 199 according to a table of settings such as table 500 shown in FIG. 9). Field detector 56 may then be used to detect if device 199 has been moved out of the NFC reader field (at step 614). If device 199 has been moved out of the field, processing may loop back to step 600, as indicated by path 618. If device 199 is still within the reader field, processing may loop back to step 604 for another transaction attempt with new operating settings, as indicated by path 616. If desired, the near field communications circuitry 50 (FIG. 3) may be reset to the default settings if receiver 54 has been idle for a predetermined period of time (e.g., if the NFC receiver has been idle for more than 5 seconds or for more than 10 seconds, as shown at step 620).

Alternatively, if some of the data packets fail to transmit during step 608, device 199 may automatically reconfigure one or more hardware parameters on device 199 (step 613), and proceed to retransmit any missing packets or to retransmit all the packets.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

The foregoing is merely illustrative of the principles of this invention and various modifications can be made by those skilled in the art. The foregoing embodiments may be implemented individually or in any combination.

Although the invention has been described in some detail for the purposes of clarity, it will be apparent that certain changes and modifications can be practiced within the scope of the appended claims. Although some of the appended claims are single dependent only or reference only some of their preceding claims, their respective feature(s) can be combined with the feature(s) of any other claim.

What is claimed is:

1. A method for using an electronic device in a mobile payment transaction at a near field communications reader device, comprising:
- initiating the mobile payment transaction when the electronic device is placed within a field generated by the near field communications reader device;
- in response to a transfer of at least one packet between the electronic device and the near field communications reader device failing, operating the electronic device using at least one new control setting, including updating by the electronic device at least one of: a transmit power control setting, a phase offset setting, a wakeup threshold setting, a damping coefficient setting, or a frame delay time setting; and
- while the electronic device is located within the field, automatically reattempting by the electronic device the mobile payment transaction using the new control setting.

2. The method defined in claim 1, wherein operating the electronic device with the at least one new control setting comprises reconfiguring the electronic device with one or more new hardware settings according to a table of predetermined settings stored on the electronic device.

3. The method defined in claim 1, wherein the electronic device includes a near field communications receiver, wherein the near field communications receiver is normally in an idle state, and wherein the near field communications receiver is activated in response to detecting that the electronic device is placed within the field.

4. The method defined in claim 3, further comprising:
- in response to detecting that the electronic device is no longer within the field after operating the electronic device using the at least one new control setting, placing the near field communications receiver back in the idle state.

5. The method defined in claim 4, further comprising:
- while the near field communications receiver is in the idle state, periodically resetting hardware settings on the electronic device so that the electronic device is configured to operate using default hardware settings when performing a subsequent mobile payment transaction.

6. The method defined in claim 1, wherein automatically reattempting the mobile payment transaction using the new control setting comprises automatically retransmitting the at least one packet, by the electronic device, using the new control setting.

7. A method for using an electronic device in a mobile payment transaction at a near field communications reader device, comprising:
- initiating the mobile payment transaction when the electronic device is placed within a field generated by the near field communications reader device;
- attempting to transfer one or more data packets associated with the mobile payment transaction from the electronic device to the near field communications reader device; and
- in response to a transfer of at least one data packet of the one or more data packets between the electronic device and the near field communications reader device failing, updating by the electronic device at least one control setting on the electronic device prior to performing a subsequent payment transaction attempt, including reconfiguring the electronic device with at least one new hardware setting according to a table of predetermined settings stored on the electronic device.

8. The method defined in claim 7, wherein reconfiguring the electronic device with at least one new hardware setting comprises reconfiguring the electronic device with an updated transmit power control setting.

9. The method defined in claim 7, wherein reconfiguring the electronic device with at least one new hardware setting comprises reconfiguring the electronic device with an updated phase offset setting.

10. The method defined in claim 7, wherein reconfiguring the electronic device with at least one new hardware setting comprises reconfiguring the electronic device with an updated wakeup threshold indicating the maximum distance that the electronic device can be located from the near field communications reader device in order for the electronic device to initiate the mobile payment transaction.

11. The method defined in claim 7, wherein reconfiguring the electronic device with at least one new hardware setting comprises reconfiguring the electronic device with an updated signal damping coefficient.

12. The method defined in claim 7, wherein reconfiguring the electronic device with at least one new hardware setting comprises reconfiguring the electronic device with an updated frame delay setting indicating a period of time that the electronic device waits before sending an acknowledgement in response to receiving a request from the near field communications reader device.

13. The method defined in claim 7, further comprising:
- while the electronic device is located within the field, automatically reattempting the mobile payment transaction using the at least one updated control setting.

14. A method for using an electronic device in a mobile payment transaction at a near field communications reader device, comprising:
- initiating the mobile payment transaction when the electronic device is placed within a field generated by the near field communications reader device;
- in response to a transfer of at least one packet between the electronic device and the near field communications reader device failing, updating by the electronic device at least one control setting on the electronic device prior to performing a subsequent payment transaction attempt; and
- while the electronic device is located within the field, automatically reattempting by the electronic device the mobile payment transaction, wherein at least one control setting is changed before reattempting the mobile payment transaction.

15. The method defined in claim 14, wherein the electronic device includes a near field communications receiver and the near field communications receiver is normally in an idle state, the method further comprising:
- returning, when the electronic device is moved out of the field, the near field communications receiver to the idle state.

16. A method for using an electronic device in a mobile payment transaction at a near field communications reader device, comprising:
- attempting to transfer one or more data packets associated with the mobile payment transaction from the electronic device to the near field communications reader device when the electronic device is placed within a field generated by the near field communications reader device; and
- in response to the transfer of at least one data packet of the one or more data packets associated with the mobile payment transaction failing, updating by the electronic device at least one control setting on the electronic device, while the electronic device is located within the field, before performing a subsequent payment attempt.

17. The method defined in claim 7, further comprising:
in response to the transfer of the at least one data packet between the electronic device and the near field communications reader device failing, waiting for the electronic device to be moved out of the field before starting a timer that sets forth a period of time within which the electronic device can be used to reattempt the mobile payment transaction at the near field communications reader device.

18. The method defined in claim 17, further comprising:
before the timer expires, detecting that the electronic device has been moved back within the field, wherein updating the at least one control setting on the electronic device comprises updating the at least one control setting on the electronic device in response to detecting that the electronic device has been moved back within the field before the timer expires.

* * * * *